United States Patent [19]
Bush et al.

[11] 3,805,340
[45] Apr. 23, 1974

[54] PLANT SUPPORT CLAMP

[75] Inventors: Leon D. Bush, 10817 El Capitan Cir., Sun City, Ariz. 85351; Austin E. Elmore, Scottsdale, Ariz.

[73] Assignee: said Bush, by said Elmore

[22] Filed: Jan. 16, 1973

[21] Appl. No.: 324,138

[52] U.S. Cl................. 24/255 SL, 24/81 CC, 47/44
[51] Int. Cl............................................ A44b 21/00
[58] Field of Search 47/44, 47; 24/261 PT, 255 CT, 24/248 SL, 248 L, 255 SL, 249 LL, 249 SL, 261 CT, 81 CC; 128/346

[56] References Cited
UNITED STATES PATENTS
| | | | |
|---|---|---|---|
| 753,046 | 2/1904 | Corts | 47/47 |
| 3,435,823 | 4/1969 | Edwards | 128/346 |
| 3,494,072 | 2/1970 | Olson | 47/44 |

Primary Examiner—Donald A. Griffin
Attorney, Agent, or Firm—Warren F. B. Lindsley

[57] ABSTRACT

A one-piece clip of flexible plastic for supporting plants having two semi-surrounding leg elements hinged together at their inner ends by a thin section of the same plastic material, which hinge tends to urge the legs to an open condition, a latching strap of the same plastic material extending from the outer end of one of the leg elements, the latching strap having formed at its outer extremity a latching bar, the strap and bar being fashioned to wrap around the other leg element, thereby holding the semi-surrounding leg elements in a closed position, the bar being retained by a shoulder formed along the length and on the outer periphery of the other leg element, and a clasp positioned at the free end of said one of said leg elements for cooperating with the latching strap for gripping an elongated member such as a cord.

6 Claims, 5 Drawing Figures

PATENTED APR 23 1974
3,805,340
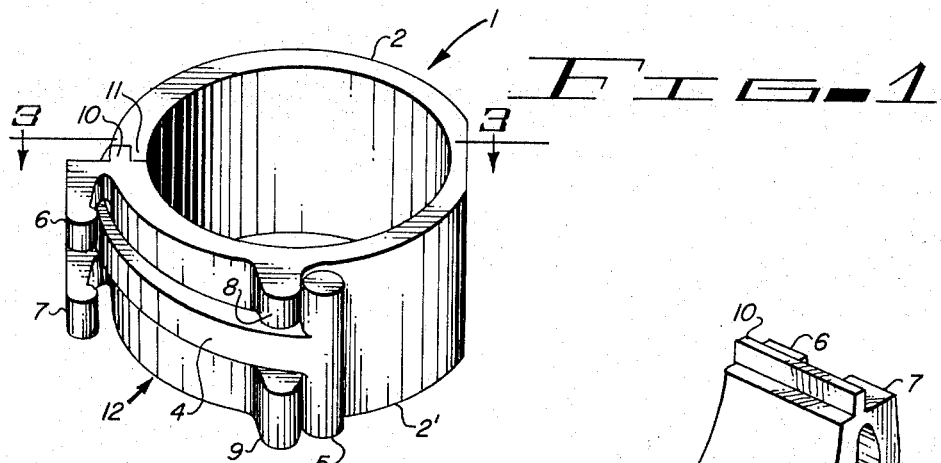
Fig-1
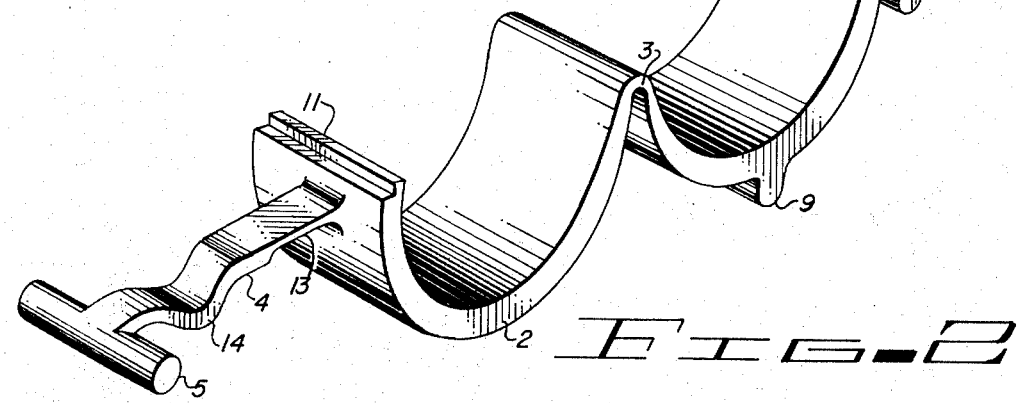
Fig-2
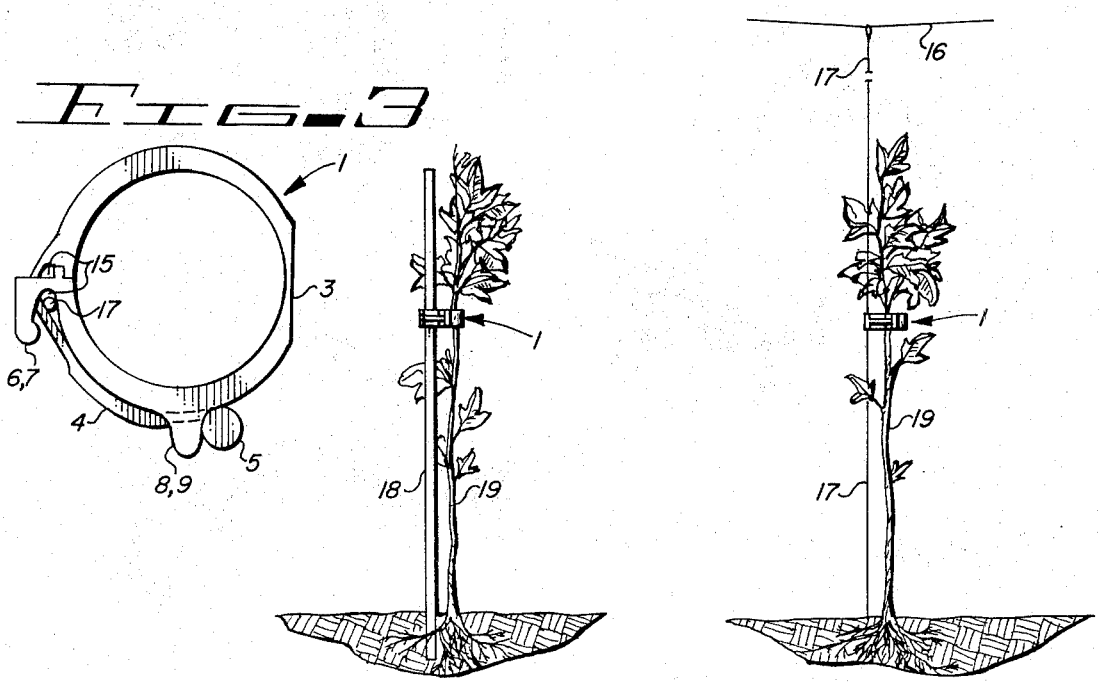
Fig-3
Fig-4
Fig-5

PLANT SUPPORT CLAMP

BACKGROUND OF THE INVENTION

In the large-scale commercial growing of tomatoes and other plants, it is necessary to support the plants by means of stakes, wires or cords during their growing period to hold them in an upright position in order to promote the full development and growth of the plants. In past practice the plants were secured to the supporting member by tying them with a cord. The securing of the plants in this manner and the periodic adjustment of the cord position as the plant matures is a time-consuming and hence costly procedure. To afford a reduction in this element of the cost of growing such plants, various types of clips and retainers have been developed.

DESCRIPTION OF THE PRIOR ART

Heretofore such clips or retainers have been formed from a flexible plastic material in a fashion which permits them to surround the plant, a supporting stake and a plant supporting cord when snapped to a closed position.

Such prior art plastic clips have significantly reduced the time involved in securing the plants and may be used and re-used again and again. While they have afforded a reduction in the time required to secure the plants, these clips are still difficult to open for repositioning and their means for gripping the cord in a jaw or clamp of the clip requires a considerable degree of dexterity in the closing and securing operation.

Because the cost of securing the plant is dependent upon the shape of the clip and because even the slightest improvement in terms of time saved in the securing operation reflects directly in the growing cost, there is a need for improved types of such clips.

SUMMARY OF THE INVENTION

Therefore, in accordance with the invention claimed, a new type of clip or clamp is provided for securing plants in an upright position during their growing period. Such a clip must be inexpensive to produce, reusable, and capable of being easily closed, opened and repositioned in a minimum of time during the course of plant growth.

It is, therefore, one object of this invention to provide a new and improved clip or retainer for securing plants or other objects to a supporting member.

Another object of the invention is to provide an inexpensive clip or retainer for securing plants that is durable, long-lasting, and which can be used a number of times.

A further object of this invention is to provide such a clip or retainer which can more easily and more quickly be secured in position with the supporting member than heretofore possible, and which grips a vertically suspended cord in a clasp of the clip arranged in a position easily reached by the user.

A still further object of the invention is to provide such a clip or retainer with cord grasping clasp which can more easily and quickly be opened for removal or repositioning than heretofore possible.

A still further object of this invention is to provide a plant retaining clip with improved means for gripping a vertical cord requiring less dexterity during the attaching and closing operation than heretofore possible.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which:

FIG. 1 is a perspective view of the disclosed clip shown in a closed position;

FIG. 2 is a perspective view of the same clip shown in the open position;

FIG. 3 is a side or end view of the same clip shown in the closed position;

FIG. 4 shows the disclosed clip secured in position about a plant and a supporting stake; and FIG. 5 shows the same clip secured in position about the plant, gripping a supporting vertical cord.

DESCRIPTION OF THE PREFERRED EMBODIMENT

Referring more particularly to the drawing by characters of reference, FIG. 1 discloses a single piece clip 1 of a sturdy, resilient and flexible plastic material comprising two semi-surrounding or arcuate leg elements 2 and 2' joined by a thin hinge section 3. A latching strap 4 extending from the outer extremity of leg element 1 is provided with a latching bar 5 at its extremity. The latching strap 4 is positioned by two projections 6 and 7 spaced in axial alignment with each other laterally across the outer extremity of leg element 2'. These projections are spaced from each other a distance substantially equal to the width of strap 4 so that the strap can lay flat against the outer periphery of leg element 2' when the clip is closed, as shown in FIGS. 1 and 3. The latching bar 5 is secured by shoulders 8 and 9 positioned in axial alignment laterally across leg element 2 and protruding from its surface at a point between its ends. The mating end surfaces of the leg elements 2 and 2' are secured to prevent radial motion by a "tongue and groove" arrangement. A tongue 10 is provided as an extension of the outer surface of leg element 2' and a groove is formed by an extension 11 of the inner surface of leg element 2. When the free ends of leg elements 2 and 2' engage the tongue of leg element 2' fits into the groove formed by leg element 2. As noted from FIG. 2, strap 4 extends from leg element 1 a short distance from its free end.

The entire clip is molded in a single piece from an inexpensive plastic material such as polypropylene, nylon, and polyethylene, among other thermosetting plastic materials which can be molded in one piece. The latching bar 5 is easily snapped into position over the shoulders 8 and 9 to hold the clip securely in its closed position. The novel design of the latching elements, including the latching bar 5 and shoulders 8 and 9, also facilitates disengagement of the clip, which is accomplished by forcing the bar outward. Release of the bar may be aided if necessary by an accompanying inward pressure at the point and in the direction indicated by the arrow 12 in FIG. 1. This facility for easy removal is accomplished without sacrifice of the holding capability of the clip.

Hinge element 3 holds the clip in an open condition when the latching elements are not engaged. This feature is realized by forming the clip in the mold in its open position shown in FIG. 2. Latching strap 4 is molded to leg element 12 and is provided with a thin flexible section 13 which permits it to be more readily wrapped around the mating end of the semi-surrounding leg element 2' when the clip is closed. A wave or arcuate section 14 in latching strap 4 acts as a spring which allows it to stretch as bar 5 is forced over the shoulder elements 8 and 9 at the free end of leg element 2' to aid in keeping strap 4 taut and securely in place.

When it is desired to use clip 1 shown in FIGS. 1-3 to support a tomato plant 19 or the like, as shown in FIGS. 4 and 5, a thin stake 18 of wood or other material is driven into the ground adjacent the plant and the curved elements 2 and 2' of the clip are manually urged together in surrounding relationship to the stalk of the plant and the stake. The latching bar 5 on the end of latching strap 4 is then snapped over shoulders 8 and 9 with latching strap 4 extending within the slots or space formed between projections 6 and 7 and shoulders 8 and 9.

The flexible nature of the clip material and the use of the thin plastic hinge section 3 provides a live hinge action or spring tension tending to bias the leg elements of the clip toward its open position due to the fact that the clip was originally molded in the open position, as shown in FIG. 2. When the latching bar 5 is snapped in place, as shown in FIGS. 1 and 3, the clip is securely closed.

With the clip locked in its closed position encircling the plant stalk, as described, the presence of the branches of the plant thereunder prevents the clip from sliding downwardly on the plant. To remove the clip it is merely necessary to force the latching bar outwardly away from the leg element 2' as heretofore explained, thereby freeing the latching bar from the projections 6 and 7 and permitting the leg sections 2 and 2' to swing apart to clip-open position, toward which they are inherently urged by the hinge section 3.

Clip 1 provides a means for supporting tomato plants or the like when the clip has been locked in its closed position surrounding the plant stalk and adjacent stake. As the plant grows, the clip can be quickly and easily opened and repositioned at a different place on the plant or additional clips can be positioned thereon, thereby eliminating the tedious and time consuming chore of manually untying, adjusting and retying the plants with twine as heretofore practiced.

As shown in FIG. 3 and 5, the novel clip disclosed and claimed herein forms a pocket or groove 15 between latching strap 4 and the free end of leg element 2 when the latching strap is bent around leg element 2' to clip locking or clasping arrangement as shown in FIGS. 1 and 3. If a cord is positioned in groove 15 before the clip is closed, it will be firmly held in place by the tension or surface pressure of latching strap 4 against the outer surface of leg element 2'.

With reference to FIG. 5, if a length of wire, string or twine 16 is strung above and along a line of plants and a twine or cord 17 is attached thereto and suspended immediately adjacent each plant, the cord 17, if placed in groove 15 of clip 1 before the clip is closed, will be clampingly retained when latching bar 5 is retained by shoulders 6 and 7. The cord may be easily released by merely opening the clip.

FIG. 3 shows the clip in a closed position illustrating clearly the capabilities of the clip for gripping cord 17. When used in this manner, cord 17 extends through groove 15 in a manner perpendicular to the drawing. In this position the cord is pressed against leg element 2 by strap 4 and is further restrained by projections 6 and 7. This cord gripping feature facilitates the installation of the clip by permitting the clip leg sections to be encircled about the plant and then, afterward, positioning the cord 17 and securing it in place with the strap as it is wrapped around the closed ends of the leg sections of the clip. In the prior art, the string or cords had to be gripped at the same time the clip was closed about the plant, thus making the installation of the clip more difficult and time consuming than in the case of the present invention.

From the foregoing detailed description it will readily be seen that a new and improved clip has been provided which permits the securing of a growing plant to a supporting stake or cord. The clip is easily and quickly closed and reopened for repositioning as the plant grows. In the preferred embodiment of the invention, the clip is molded from a plastic material but the use of other suitable materials is not to be excluded such as metal. Other applications of the clip will also be readily apparent such as securing wires, cables or other slender or stranded materials in bunches or bundles. The clip may be used also for securing signal light cords to a hospital bed, holding tubing in a hospital for intravenous feedings and other uses readily apparent to the mechanic or electrician.

Although but one embodiment of the present invention has been illustrated and described, it will be apparent to those skilled in the art that various changes and modifications may be made therein without departing from the spirit of the invention or from the scope of the appended claims.

What is claimed is:

1. A one-piece clip molded of resilient and flexible material comprising:

a first substantially semi-circular leg element having an inner end and an outer end portion, a second substantially semi-circular leg element having an inner end and an outer end portion, an integral plastic hinge means of reduced thickness connecting inner ends of said first and second leg elements and inherently urging said leg elements to an open position with said outer end portions separated, said first and second leg elements being adapted to be manually swung about said hinge connection to a closed position with their outer end portions abutting to form a substantially circular enclosure, one end of one outer end portion being provided with a tongue for fitting into a groove formed in the end of the other end portion when said outer end portions of said leg elements interfitting locking means for holding the outer end portions together, said locking means comprising a flexible strip attached to one of said leg elements adjacent its outer end for extending around the outer periphery of the other of said leg elements, and means on the outer periphery of said other of said leg elements for engaging with said flexible strip for holding said leg elements in the circular configuration.

2. The one-piece clip set forth in claim 1 wherein:
said flexible strip comprises a strap having a latching bar positioned laterally of said strap at its outer end, and
said means on the outer periphery of said other of said leg elements comprises a clasp for engaging with said latching bar.

3. The one-piece clip set forth in claim 2 wherein:
said clasp is positioned on the outer periphery of the other of said leg elements at substantially its midpoint.

4. The one-piece clip set forth in claim 1 wherein:
said flexible strip of said one of said leg elements, when overlapping the other of said leg elements, forms a groove-like clamping means between said strip and said one of said leg elements adjacent its attachment to said one of said leg elements for gripping an elongated, axially extending element when said clip is closed.

5. The one-piece clip set forth in claim 1 wherein:
said strip is formed integral with and of the same material as said leg element to which it is attached.

6. The one-piece clip set forth in claim 1 wherein:
said first leg element is provided with an oppositely curved outer end portion,
said oppositely curved outer end portions comprising two aligned projections forming a slot therebetween through which said strip extends when overlapping said second leg element,
said strip when overlapping said second leg element forming a groove-like clamping means between said strip and said first leg element at the point of attachment of said strip for gripping an elongated, axially extending element when said clip is closed, and
said projections locking said axially extending element in said clamping means.

* * * * *